Patented May 26, 1936

2,041,744

UNITED STATES PATENT OFFICE 2,041,744

PULVERULENT CLEANING COMPOSITION

Arthur B. Cummins, Plainfield, N. J., assignor to Johns-Manville Corporation, New York, N. Y., a corporation of New York No Drawing. Application June 13, 1932, Serial No. 617,048

5 Claims. (Cl. 87—5)

This invention relates to a diatomaceous earth composition. It pertains especially to a composition of matter adapted for use as a cleanser or a polish and containing diatomaceous earth that has been calcined in comminuted form. A preferred embodiment is a cleanser containing diatomaceous earth calcined in comminuted form and an emulsification agent and/or a detergent.

Many common household cleansers comprise an emulsification agent, such as powdered soap, a detergent, such as trisodium phosphate or soda ash, and an abrasive. Abrasives that are used in conventional cleansers are of the type of feldspar, quartz, or pumicite, all in finely ground form. The scratching of surfaces to which the cleanser is applied has been recognized as a disadvantage, and attempts have been made to prepare or select an abrasive of adequate cutting or cleansing action with a minimum of the undesired scratching action.

Thus, attempts have been made to use diatomaceous earth and there has been a limited use of comminuted diatomaceous earth in the natural condition, in cleansers and polishes. Such earth has been found too soft and not sufficiently rapid in its cutting action, for many purposes.

I have now discovered that certain objections to the natural earth in comminuted form, as an ingredient of cleansers, may be overcome and products of broad utility made by the substitution of diatomaceous earth that has been calcined in comminuted form, as illustrated in the following example.

Diatomaceous earth, such as high quality material from an important Lompoc, California, deposit, containing over 92 percent of silica on the dry basis, is treated by a process including calcination, in comminuted form in the presence of a flux, as, for example, as described in U. S. Patent 1,502,547 to Calvert, Dern and Alles. Thus the diatomaceous earth is first dried and comminuted, that is, finely divided without destruction of the diatomic structure, mixed with a small proportion of a flux, say 5 percent of anhydrous sodium carbonate, and then calcined at a temperature at which there is moderate sintering action, as, for example, at 1800° F. The product of the calcination is then cooled and again comminuted in such manner as to disintegrate partly the clusters formed during the calcination, without destroying the diatomic structure of the product. It will be understood that there is some fracturing of individual diatoms during the comminuting process, both before and after the calcination, but that there is not complete destruction of such structure. The result is a porous product composed of inherently hard material, chiefly silica, but having a weak structure. Such a product is widely used as a filter aid, as in sugar refining.

The diatomaceous earth product so made will vary somewhat in particle size, depending upon the exact method of milling or comminuting and other features of the process or quality of diatomaceous earth used as the raw material. In a typical operation there has been produced a calcined product containing a substantial proportion, more than 5 percent, usually 10 to 15 percent, of particles that are retained on a 325-mesh screen in a wet screening test, and less less than 2 percent retained on a 30-mesh screen in a similar test.

The calcined product made as described is white in color, the particular shade of white varying somewhat with the conditions of manufacture and quality of diatomaceous earth used as the raw material, and being sometimes of a slight pink cast.

The material so made is adapted for use in cleansers, for example. In making a cleanser, the diatomaceous earth which has been calcined in comminuted form in the presence of a flux, is mixed with an emulsification agent and/or a detergent. The mixing is suitably performed in a gentle manner, as in a vessel provided with a horizontal agitator, whereby the diatomic structure of the calcined diatomaceous earth is not destroyed, in distinction from a condition that might result from thoroughly grinding together the ingredients, as in a ball mill.

As the emulsification agent, there is used a small amount of powdered soap. The amount used is preferably in excess of 2 percent, and suitably 5 to 10 percent.

The detergent used may be trisodium phosphate, the proportion being suitably 5 to 30 percent, as, for example, 15 percent.

The proportion of diatomaceous earth used is suitably 65 to 90% of the entire cleansing composition.

All proportions in the specifications and also in the claims are expressed as percentage, by which is meant parts by weight for 100 parts of finished mixture.

The compositions, it will be noted, consist chiefly of the diatomaceous earth that has been calcined as described and a small proportion only of other ingredients. These proportions are critical in making a cleaning and polishing composition, which, because of the evident effect of the large proportion of insoluble material, is adapted for use in moistened paste form, as distinguished from a bar of soap, for instance. The latter contains only a relatively small proportion of material of the type of diatomaceous earth and a predominating proportion of soap. If it were attempted to use a composition of this latter type in powdered form, as a cleaning or polish-ing paste, the large proportion of soap would impart a yieldable nature to the composition and obscure the desired abrasive action of the small amount of admixed diatomaceous earth. Further, the important density-reducing effect of the very bulky diatomaceous earth is largely lost in a soap bar or the like in which the proportion of diatomaceous earth is small and the compact soap, of necessity, fills the voids within or between the microscopic particles of the said earth.

The mixture of diatomaceous earth calcined in comminuted form in the presence of a flux and the emulsification agent and/or the detergent, has several interesting properties. The mixture, as usually made, is nearly pure white. It is a pulverulent composition that has a superior polishing action, possibly explained by the weak structure of the abrasive ingredient; a porous diatomic structure, although composed of inherently hard material, may crush under the application, during use as a cleanser, or certain pressures which would cause scratching of the surface being cleaned, were it not for the crushing of the weak structure of the abrasive. Also, the porous structure permits of some absorption of dirt, greases, and the like, within the abrasive. In addition, the clenser mixture is very bulky; a typical preparation weighs not substantially more than 20 pounds per cubic foot, as compared to a weight of 33 to 78 pounds per cubic foot for a large number of conventional household cleansers. This bulkiness of my improved composition is accompanied by a decrease in the number of pounds required to clean a given area of certain surfaces. Thus, in a comparable usage, it has been found that my improved composition will clean a substantially larger area than an equal weight of a more dense cleanser. In fact, certain results indicate that the area which can be cleaned is roughly proportional to the increase in bulk of my cleanser as compared to that of certain conventional cleansers.

The utility of a cleanser having adequate cutting action or abrasive action on dirt, grease, and the like, with a minimized scratching action, should be evident. Thus, the material is satisfactory for polishing or cleaning dishes, cutlery, window glass, porcelain, and woodwork. Cleansed, highly polished, and well appearing surfaces may be imparted to the article cleaned.

Certain improvements may be made to the cleanser described above.

Thus, the mixture, after being made by the method described, may be aged, as at atmospheric or an elevated temperature. Thus the material may be warmed, suitably at a temperature not in excess of 212° F., for a short period before being filled into packages for shipment or use. This warming before packaging increases the freedom of flowing of the mixture from the package during use, as, for example, through perforations in the top of the package. It is possible that this preliminary warming may cause a partial drying of the emulsification agent or detergent, as by vaporization of a small amount of water from the mixture, or a redistribution of the moisture content within the mixture.

When the aging is made at atmospheric temperature, the mixture of the calcined diatomaceous earth, emulsification agent and detergent is allowed to stand for a substantial period, as, for example, several hours, and suitably about a day, before the mixture is packed into the final container for shipment. Here, again, a redistribution of moisture between the several ingredients of the mixture may occur.

Curiously enough, free flowing is sometimes achieved also by the removal of grit from the calcined diatomaceous earth. This removal of grit is desirable, in addition, as a means of decreasing the tendency of the cleanser to scratch certain relatively soft surfaces to which it may be applied. Removal of the grit is accomplished in a convenient manner, for example, by suspending the comminuted calcined diatomaceous earth in a rapidly moving stream of air, forming this stream of air into a thin band and sharply deflecting the band flatwise. The diatomaceous earth remaining in the deflected band is separated by conventional means. The separated earth is then ready for use.

It should be understood that the invention is not limited to any one explanation of the action of the aging of the cleansing mixture or the removal of grit from the calcined diatomaceous earth used in making the cleansing mixture, on the flowing properties of the final mixture. Also, it is not maintained that these factors would have equal effect on cleanser mixtures containing different ingredients or containing a different quality of diatomaceous earth.

Many variations may be made from the illustrative example that has been given, without departing from the scope of the invention.

Thus, the diatomaceous earth, calcined in comminuted form in the presence of a flux, may be substituted by diatomaceous earth calcined in comminuted form in the absence of a flux. In such cases, there may be used a comminuted calcined diatomaceous earth product made in a manner similar to that described in United States Patent 1,477,394 to Thatcher. However, such a material is not as desirable in cleansers for many purposes as the preferred form of diatomaceous earth, described above, that is, the product of the calcination of comminuted diatomaceous earth in the presence of a flux. For example, the diatomaceous earth calcined in the absence of a flux, as described in the aforesaid patent to Thatcher, has a weaker structure that gives to the product a softer and milder abrasive action. It will be understood that some of the reenforcing of the structure of the diatomaceous earth when the earth is calcined in the presence of a flux may be due to the action of the flux upon the diatomaceous earth. This particular reenforcing action due to the use of the flux is obviously not present in diatomaceous earth that has been calcined in the absence of a flux. Also, the diatomaceous earth calcined in the absence of a flux may have a buff to pink color, suggestive of oxidized iron. For this reason cleansers made with such a product are not white.

When a very mild abrasive action is desired, the diatomaceous earth present in the cleanser may be an air-separated and almost impalpable grade. Such a grade may be made, for example, by calcining comminuted diatomaceous earth, either alone or in the presence of a flux, as described in the above mentioned patents to Thatcher and to Calvert, Dern and Alles, comminuting the calcined product, then making a suspension of it in a rapidly moving stream of air, passing the suspension through a series of cyclonic dust separators to remove the major part of the suspended dust, and finally collecting a very fine fraction in a subsequent dust collecting apparatus, such as a stocking or bag house collector, in which the air content of the suspension filters out through fabric and the very fine suspended solid particles are retained inside the fabric. Thus there may be made a product containing more than 50 percent by weight of particles of size smaller than 6 microns and not more than 2 percent retained on a 325-mesh screen, in a wet screening test. A typical product so made contains 60 to 90 percent and frequently about 80 percent of particles of size ranging from 3 to 6 microns, as measured by the Oden sedimentation test.

To this impalpable or air-separated powder there are disadvantages when it is used for certain types of cleansers, due to the very mild abrasive action of the unusually fine powder. On the other hand, this extreme mildness of abrasive action is not objectionable when the product is used in certain polishes, as will be described later.

Another type of diatomaceous earth product which is useful in cleansers is a material of larger average particle size than any of those diatomaceous earth products described above. This material of larger particle size may be made, for example, as described in U. S. Patent 1,970,280 issued to me on August 14, 1934 and entitled Siliceous product and process of making the same. Thus, the material may be made by comminuting natural diatomaceous earth, suitably high grade material from an important Lompoc, California, deposit, suspending the comminuted product in a rapidly moving air stream, separating from the air stream the major part of the suspended particles, as by passage through a series of cyclonic dust collectors, and then collecting the fine particles, as in a fabric dust collector, to give a very fine powder which, in a typical preparation, showed less than 0.5% of particles of average size larger than 10 microns, 34.5% of particles of size 10 to 2 microns, and 65% of particles smaller than 2 microns. This very fine material is then calcined in the presence of a small amount of a flux. Thus it may be mixed very intimately with 5% of anhydrous sodium carbonate, the resulting mixture calcined at about 1800° F., and the calcined product comminuted, as by passage through a high speed blower. The final result is a material containing a large proportion of more or less spherular granules. In a typical preparation more than half of the material is finer than 30-mesh and coarser than 150-mesh.

The diatomaceous earth products above described and constituting the abrasive in the finished composition are preferably so finely divided that the major portion, suitably 85 percent or more, will pass a 325-mesh screen in the wet screening test, and should be insoluble in water and in other neutral substances, such as hydrocarbons, grease, and the like.

Also, the ingredients used in association with the abrasive may be varied to include conventional cleanser ingredients. Thus, the emulsification agent used may be an alkali metal soap, as, for example, sodium soap or a potassium soap, or other material adapted to emulsify dirt and remove it from a surface after the dirt has been loosened therefrom by the action of the abrasive in the cleanser. Another emulsification agent that may be used, but that is not preferred, is saponin. The detergent should be a water-soluble material that assists in the emulsification of the dirt. It may decrease surface tension, neutralize acid materials, and/or saponify fats and greases. Some detergents that have been used satisfactorily show a pH value in excess of 10, as, for example, approximately 11, when tested in a solution of 0.1 part by weight of the detergent in 99.9 parts by weight of water. Among the detergents which have been used satisfactorily are soda ash (powdered anhydrous sodium carbonate), sodium perborate, and sodium metasilicate, in addition to trisodium phosphate which has been previously mentioned. The emulsification agents and detergents named specifically are illustrative of the type of materials that may be used. In general, the emulsification agent and/or detergent should be one that is commonly used in cleansing or polishing compositions for the purpose for which the improved composition of the present invention is intended.

It will be obvious that the properties of the cleansers will be somewhat affected by the proportions of the various ingredients present. Thus, a high proportion of alkaline detergent, as, for example, 30 percent of trisodium phosphate, may make a cleanser that is somewhat irritating to the hands during use of the cleanser.

It should be understood also that the abrasive may be used with either the emulsification agent or detergent alone, but preferably with both jointly.

Of the other materials that are conventional in cleansing and polishing compositions and that may be used in my improved composition, a number are mentioned below in connection with polishing compositions.

In making polishes, particularly those for smooth surfaces, such as that of a lacquered automobile or brightly polished metal, there may be made compositions having milder abrasive, emulsification and/or detergent properties than the cleansers described above. Also, ingredients may be added to adapt the composition for the particular use to which the composition is to be put. Thus, for a metal polish there may be used, for example, calcined diatomaceous earth to which is admixed a small proportion of oxalic acid or dilute ammonia water. Likewise, a special composition may be made for polishing a lacquered surface. In this case the composition may comprise a solvent for greases that is not a solvent for the lacquer finish, as, for example, a hydrocarbon such as gasoline, a wax, and/or a light rubbing oil, in addition to calcined diatomaceous earth. Stearic acid may also be used in such a composition. The calcined diatomaceous earth used in my polishing compositions may be suitably the impalpable powder described above, such as one made by air separation from coarser particles.

Diatomaceous earth alone does not constitute a cleansing or polishing composition, in the sense that the terms are used by me.

Since the details that have been given are for the purpose of illustration and not restriction of the invention, it is intended that variations within the spirit of the invention are to be included in the scope of the claims.

What I claim is:

1. A pulverulent composition of matter adapted for use as a cleanser, weighing not substantially more than 20 pounds to the cubic foot and comprising calcined diatomaceous earth particles retaining their diatomic structure not more than 2% of which are retained on a 30-mesh screen, and more than 5% of which are retained on a 325-mesh screen in a wet screening test, a powdered water-soluble soap and a detergent selected from the group consisting of sodium carbonate, sodium borate, sodium silicate and trisodium phosphate, the proportions by weight of the several ingredients of the said composition being of the order of the following: 65 to 90 parts of the diatomaceous earth, 2 to 10 parts of the soap, and 5 to 30 parts of the detergent.

2. A pulverulent cleanser composition weighing not substantially more than twenty pounds to the cubic foot and comprising 65 to 90 parts of calcined comminuted grit-free diatomaceous earth, 2 to 10 parts of an emulsification agent selected from the group consisting of an alkali metal soap and saponin and 5 to 30 parts of a detergent selected from the group consisting of sodium carbonate, sodium borate, sodium silicate, and trisodium phosphate.

3. A pulverulent cleanser composition weighing not substantially more than twenty pounds to the cubic foot and comprising 65 to 90 parts of flux-calcined comminuted grit-free diatomaceous earth, 2 to 10 parts of an emulsification agent selected from the group consisting of an alkali metal soap and saponin and 5 to 30 parts of a detergent selected from the group consisting of sodium carbonate, sodium borate, sodium silicate, and trisodium phosphate.

4. A moisture-containing pulverulent cleanser composition weighing not substantially more than twenty pounds to the cubic foot and comprising 65 to 90 parts of calcined comminuted grit-free diatomaceous earth, 2 to 10 parts of an emulsification agent selected from the group consisting of an alkali metal soap and saponin and 5 to 30 parts of a detergent selected from the group consisting of sodium carbonate, sodium borate, sodium silicate, and trisodium phosphate, the moisture in the composition being distributed therethrough by ageing, whereby the composition is made free-flowing.

5. A pulverulent cleanser composition weighing not substantially more than twenty pounds to the cubic foot and comprising 65 to 90 parts of calcined diatomaceous earth, 2 to 10 parts of an emulsification agent selected from the group consisting of an alkali metal soap and saponin and 5 to 30 parts of a detergent selected from the group consisting of sodium carbonate, sodium borate, sodium silicate, and trisodium phosphate, the diatomaceous earth being in the form of a granular product, more than half of which is finer than 30-mesh and coarser than 150-mesh, resulting from calcining with a flux a very fine diatomaceous earth powder.

ARTHUR B. CUMMINS.